(12) United States Patent
Grootaert et al.

(10) Patent No.: US 6,794,457 B2
(45) Date of Patent: Sep. 21, 2004

(54) FLUOROPOLYMER CURING SYSTEM CONTAINING A NITROGEN CURE SITE MONOMER

(75) Inventors: Werner M. A. Grootaert, Oakdale, MN (US); Robert E. Kolb, Afton, MN (US); Klaus Hintzer, Kastl (DE)

(73) Assignee: 3M Innovative Properties Company, St. Paul, MN (US)

( * ) Notice: Subject to any disclaimer, the term of this patent is extended or adjusted under 35 U.S.C. 154(b) by 47 days.

(21) Appl. No.: 10/136,020

(22) Filed: Apr. 29, 2002

(65) Prior Publication Data

US 2002/0183458 A1 Dec. 5, 2002

Related U.S. Application Data

(60) Provisional application No. 60/287,634, filed on Apr. 30, 2001.

(51) Int. Cl.$^7$ .................................................. C08F 8/32
(52) U.S. Cl. ............................... 525/326.3; 525/326.4; 525/351; 525/355; 525/359.2; 525/374; 525/375; 525/379
(58) Field of Search .......................... 525/326.4, 369.2, 525/351, 355, 374, 375, 379, 326.3

(56) References Cited

U.S. PATENT DOCUMENTS

| | | |
|---|---|---|
| 3,523,132 A | 8/1970 | Dorfman et al. |
| 3,546,186 A | 12/1970 | Gladding et al. |
| 3,686,143 A | 8/1972 | Bowman |
| 3,752,787 A | 8/1973 | De Brunner |
| 4,035,565 A | 7/1977 | Apotheker et al. |
| 4,259,463 A | 3/1981 | Moggi et al. |
| 4,281,092 A | 7/1981 | Breazeale |
| 4,335,238 A | 6/1982 | Moore et al. |
| 4,487,903 A | 12/1984 | Tatemoto |
| 4,564,662 A | 1/1986 | Albin |
| 4,694,045 A | 9/1987 | Moore |
| 4,734,465 A | 3/1988 | Moggi et al. |
| 4,762,891 A | 8/1988 | Albin et al. |
| 4,882,390 A | 11/1989 | Kolb |
| 4,912,171 A | 3/1990 | Grootaert et al. |
| 4,948,853 A | 8/1990 | Logothetis |
| 4,972,038 A | 11/1990 | Logothetis |
| 4,983,680 A | 1/1991 | Ojakaar |
| 5,032,655 A | 7/1991 | Moore |
| 5,262,490 A | 11/1993 | Kolb et al. |
| 5,266,650 A | 11/1993 | Guerra et al. |
| 5,268,405 A | 12/1993 | Ojakaar et al. |
| 5,285,002 A | 2/1994 | Grootaert |
| 5,319,025 A | 6/1994 | Weigelt |
| 5,349,093 A | 9/1994 | Oka et al. |
| 5,451,625 A | 9/1995 | Fukushi |
| 5,527,861 A | 6/1996 | Logothetis |
| 5,554,680 A | 9/1996 | Ojakaar |
| 5,565,512 A | 10/1996 | Saito et al. |
| 5,585,449 A | 12/1996 | Arcella et al. |

(List continued on next page.)

FOREIGN PATENT DOCUMENTS

| | | |
|---|---|---|
| EP | 0 140 207 A2 | 5/1985 |
| EP | 0 708 139 A1 | 4/1996 |
| EP | 0 769 521 A1 | 4/1997 |
| EP | 0 661 304 B1 | 10/1997 |
| EP | 0 784 064 B1 | 11/1999 |
| JP | 09 183879 A | 7/1997 |
| WO | WO 90/14368 | 11/1990 |
| WO | WO 99/48939 | 9/1999 |
| WO | WO 00/09569 | 2/2000 |
| WO | WO 00/09603 | 2/2000 |
| WO | WO 01/02448 A1 | 1/2001 |
| WO | WO 01/59005 A2 | 8/2001 |

OTHER PUBLICATIONS

Brown et al., "Reactions of Perfluoroalkyl Nitriles. V. Synthesis of Perfluoroacyl Imidates", *J. Org. Chem.*, vol. 30, (1965), pp. 3724–3728.

Yakubovich et al., "Syntheses in the 1,3,5–Triazine Series V. Iminoesters of Perfluorocarboxylic Acids–Synthese, Properties, and Mechanism of Cyclopolymerization to 1,3,5–Triazine Derivatives", pp. 878–885, (translated from *Zhurnal Obshchei Khimii*, vol. 36, No. 5, pp 863–871, May 1966).

Grinblat et al., "Infrared Investigation of The Vulcanization of Perfluoroalkylenetriazine Polymers", *Polymer Science U.S.S.R.*, vol. 21, 1980, pp. 1434–1441.

Paciorek et al., "Reactions of Perfluoronitriles. I. Interactions with Aniline", *Journal of Fluorine Chemsitry*, 30 (1985), pp. 241–250.

*Primary Examiner*—Bernard Lipman
(74) *Attorney, Agent, or Firm*—Dean M. Harts

(57) ABSTRACT

A composition comprising a fluoropolymer comprising interpolymerized units derived from a nitrogen-containing cure site monomer; and a catalyst composition comprising a compound having the general formula:

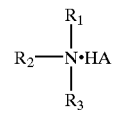

wherein the group HA is an acid, and each $R_1$, $R_2$, and $R_3$ is, independently, the same or a different $C_1$–$C_{20}$ alkyl group, a $C_3$–$C_{20}$ cyclic or heterocyclic group, $R_f(CH_2)_x$— wherein $R_f$ is a $C_1$–$C_8$ linear or branched and at least partially fluorinated alkylene, cycloalkylene, or oxyalkylene, and x is 1 to 4, or a bond to another R group such that the nitrogen is bonded to or part of an imino or heterocyclic group; wherein two or more R groups may be linked to form a cyclic, bicyclic or aromatic group, optionally comprising a heteroatom. Also provided are a method of making a fluoropolymer composition and articles prepared from the compositions.

26 Claims, 1 Drawing Sheet

U.S. PATENT DOCUMENTS

| | | |
|---|---|---|
| 5,591,804 A | 1/1997 | Coggio et al. |
| 5,621,145 A | 4/1997 | Saito et al. |
| 5,639,837 A | 6/1997 | Farnham et al. |
| 5,654,375 A | 8/1997 | Jing et al. |
| 5,677,389 A | 10/1997 | Logothetis et al. |
| 5,681,881 A | 10/1997 | Jing et al. |
| 5,700,879 A | 12/1997 | Yamamoto et al. |
| 5,728,773 A | 3/1998 | Jing et al. |
| 5,756,588 A | 5/1998 | Kolb et al. |
| 5,767,204 A | 6/1998 | Iwa et al. |
| 5,789,489 A | 8/1998 | Coughlin et al. |
| 5,789,509 A | 8/1998 | Schmiegel |
| 5,877,264 A | 3/1999 | Logothetis et al. |
| 5,910,552 A | 6/1999 | Saito et al. |
| 6,077,609 A | 6/2000 | Blong et al. |
| 6,114,452 A | 9/2000 | Schmiegel |
| 6,211,319 B1 | 4/2001 | Schmiegel |
| 6,281,296 B1 | 8/2001 | MacLachlan et al. |
| 6,465,576 B1 * | 10/2002 | Grootaert et al. ........... 525/199 |
| 6,593,416 B2 * | 7/2003 | Grootaert et al. ........... 524/545 |

* cited by examiner

FLUOROPOLYMER CURING SYSTEM CONTAINING A NITROGEN CURE SITE MONOMER

CROSS REFERENCE TO RELATED APPLICATION

This application claims priority to U.S. Provisional Patent Application No. 60/287,634, filed Apr. 30, 2001.

TECHNICAL FIELD

This invention relates to curing fluoropolymer compositions having nitrogen-containing cure-site components.

BACKGROUND

Fluorine-containing polymers (also known as "fluoropolymers") are a commercially useful class of materials. Fluoropolymers include, for example, crosslinked fluoroelastomers, uncrosslinked fluoroelastomer gums, semi-crystalline fluoroplastics, and or glassy fluoroplastics. Fluoroplastics are generally of high thermal stability and are particularly useful at high temperatures. They may also exhibit extreme toughness and flexibility at very low temperatures. Some have very low dielectric loss and high dielectric strength, and may have unique low friction properties.

Fluoroelastomers exhibit significant tolerance to high temperatures and harsh chemical environments. Consequently, they are particularly well-adapted for use as seals, gaskets, and other molded parts in systems that are exposed to elevated temperatures and/or corrosive chemicals. Such parts are widely used in the chemical processing, semiconductor, aerospace, and petroleum industries, among others.

Fluoroelastomers often include a cure-site component to facilitate cure in the presence of a catalyst. One class of useful cure-site components includes nitrogen-containing monomers. Organotin catalysts are typically used as cure catalysts. Such catalysts, however, are toxic and can leave undesirable extractable metal residues in the cured product.

SUMMARY

In one aspect, the invention relates to a composition that includes (a) a fluoropolymer having interpolymerized units derived from a nitrogen-containing cure site monomer, and (b) a catalyst composition that includes a compound having the general formula:

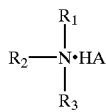
(1)

wherein the group HA is an inorganic or organic acid, e.g., HCl, HNO$_3$, C$_7$F$_{15}$COOH, and wherein R$_1$, R$_2$, and R$_3$ are each, independently, the same or different alkyl groups having from 1 to about 20 carbon atoms, which may be cyclic or heterocyclic, and one R group may instead be a bond to another R group such that the nitrogen is bonded to or part of an alkenyl, cycloalkenyl, or aromatic group. The substituents may also be olefinic, e.g., mono, di, and trialkyl amine salts, and pyridine salts. R$_1$, R$_2$, and R$_3$ may be fluorinated groups such as R$_f$(CH$_2$)$_x$— wherein R$_f$ is a C$_1$–C$_8$ linear or branched and at least partially fluorinated (i.e., fluorinated or perfluorinated) alkylene, cycloalkylene, or oxyalkylene, and x is 1 to 4 (more preferably 1 or 2). Examples of catalyst compositions include compounds of the formula:

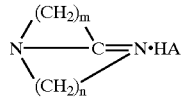
(1A)

wherein m and n are, independently, 2 to 20.

When a compound has more than one nitrogen atom, the mono, di, and higher salts are also useful.

The composition may further include a second catalyst composition comprising a compound having the formula R$^1$C(OR$^2$)=NH, and salts thereof, where R$^1$ and R$^2$ are, independently, a substituted or unsubstituted C$_1$–C$_{20}$ (preferably C$_1$–C$_{10}$, more preferably C$_1$–C$_7$) alkyl, aryl, aralkyl, alkenyl, cycloalkyl, or cycloalkenyl group.

In other aspects, the invention provides a method for curing this composition, as well as curable and cured articles comprising these compositions.

The compositions retain the advantages of the use of nitrogen-containing cure site monomers such as the high temperature performance properties and chemical resistance typically achieved when organotin compounds are used as the catalyst system with such cure site monomers. At the same time, the compositions exhibit markedly improved compression set values. The compositions are useful in applications where polymer stability (e.g., thermal stability) and/or chemical resistance are important. They are also useful in silicon wafer fabrication.

The details of one or more embodiments of the invention are set forth in the accompanying drawings and the description below. Other features, objects, and advantages of the invention will be apparent from the description and from the claims.

DETAILED DESCRIPTION

Figure 1:
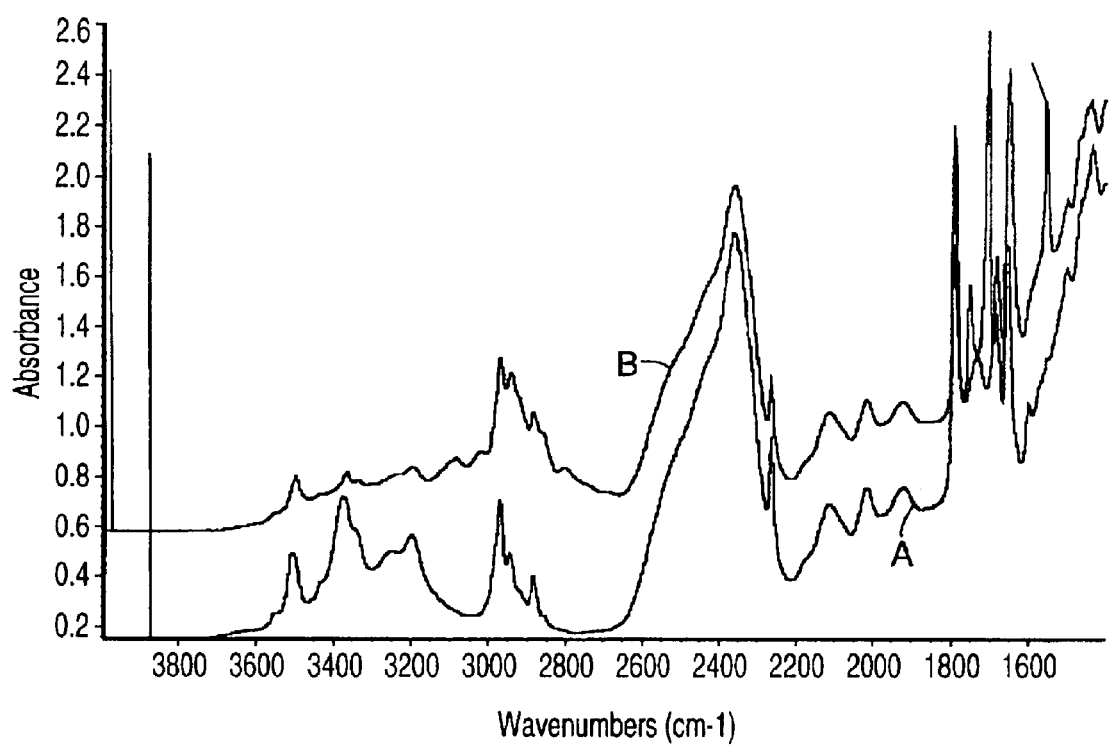
FIG. 1 is a Fourier Transform Infrared spectrum showing a cured material of the present invention and a comparative cured material.

The composition of the present invention comprises a fluoropolymer having interpolymerized units derived from a cure site monomer comprising a nitrile group and a catalyst composition of Formula (1).

Suitable fluoropolymers include interpolymerized units derived from a nitrile group-containing monomer and, preferably, at least two principal monomers. Examples of suitable candidates for the principal monomer(s) include perfluoroolefins (e.g., tetrafluoroethylene (TFE) and hexafluoropropylene (HFP)), perfluorovinyl ethers (e.g., perfluoroalkyl vinyl ethers and perfluoroalkoxy vinyl ethers), and hydrogen-containing monomers such as olefins (e.g., ethylene, propylene, and the like) and vinylidene fluoride (VDF). Such fluoropolymers include, for example, fluoroelastomer gums and semi-crystalline fluoroplastics.

When the fluoropolymer is perhalogenated, preferably perfluorinated, it contains at least 50 mole percent (mol %) of its interpolymerized units derived from TFE and/or CTFE, optionally including HFP. The balance of the interpolymerized units of the fluoropolymer (10 to 50 mol %) is made up of one or more perfluoro vinyl ethers and a suitable cure site monomer. The cure site monomer makes up from about 0.1 to about 5 mol % (more preferably from about 0.3 to about 2 mol %) of the elastomer.

When the fluoropolymer is not perfluorinated, it contains from about 5 to about 90 mol % of its interpolymerized units derived from TFE, CTFE, and/or HFP, from about 5 to about 90 mol % of its interpolymerized units derived from VDF, ethylene, and/or propylene, up to about 40 mol % of its interpolymerized units derived from a vinyl ether, and from about 0.1 to about 5 mol % (more preferably from about 0.3 to about 2 mol %) of a suitable cure site monomer.

Suitable perfluorinated vinyl ethers include those of the formula:

$$CF_2=CFO(R_fO)_aR_f \qquad (2)$$

where each $R_f$ is, independently, a linear or branched perfluoroalkylene group of 1–6 carbon atoms; and a is 0 or an integer from 1 to 20.

A preferred class of perfluoroalkyl vinyl ethers includes compositions of the formula:

$$CF_2=CFO(CF_2CFXO)_dR^4_f \qquad (3)$$

wherein X is F or $CF_3$; d is 0–5, and $R^4_f$ is a perfluoroalkyl group of 1–6 carbon atoms.

Most preferred perfluoroalkyl vinyl ethers are those where, in reference to either Formula (2) or (3) above, d is 0 or 1, a is 2, and each $R_f$ contains 1–3 carbon atoms. Examples of such perfluorinated ethers include perfluoromethyl vinyl ether, perfluoroethyl vinyl ether, and perfluoropropyl vinyl ether.

Other useful perfluorinated monomers include those compounds of the formula:

$$CF_2=CFO[(CF_2)_e(CFZ)_gO]_hR^4_f \qquad (4)$$

where $R^4_f$ is a perfluoroalkyl group having 1–6 carbon atoms, e is 1–5, g is 0–5, h is 0–5, and Z is F or $CF_3$. Preferred members of this class are those in which $R^4_f$ is $C_3F_7$ or $CF_3$, e is 1–2, g is 0–1, and h is 1.

Additional perfluoroalkyl vinyl ether monomers useful in the invention include those of the formula:

$$CF_2=CFO[(CF_2CF(CF_3)O)_k(CF_2)_pO(CF_2)_q]C_rF_{2r+1} \qquad (5)$$

where k is 0 or an integer from 1–10, p is an integer of from 1–6, q is 0–3, and r is 1–5. Preferred members of this class include compounds where k is 0 or 1, p is 1–5, q is 0 or 1, and r is 1.

Perfluoroalkoxy vinyl ethers useful in the invention include those of the formula:

$$CF_2=CFO(CF_2)_t[CF(CF_3)]_uO(CF_2O)_wC_xF_{2x+1} \qquad (6)$$

wherein t is 1–3, u is 0–1, w is 0–3, and x is 1–5, preferably 1. Specific, representative, examples of useful perfluoroalkoxy vinyl ethers include $CF_2=CFOCF_2OCF_2CF_2CF_3$, $CF_2=CFOCF_2OCF_3$, $CF_2=CFO(CF_2)_3OCF_3$, and $CF_2=CFOCF_2CF_2OCF_3$.

Mixtures of perfluoroalkyl vinyl ethers and perfluoroalkoxy vinyl ethers may also be employed.

Perfluoroolefins useful in the invention include those of the formula:

$$CF_2=CF-R^5_f \qquad (7)$$

where $R^5_f$ is fluorine or a perfluoroalkyl of 1 to 8, preferably 1 to 3, carbon atoms.

In addition, partially-fluorinated monomers or hydrogen-containing monomers such as olefins (e.g., ethylene, propylene, and the like), and vinylidene fluoride can be used in the fluoropolymer of the invention.

One example of a useful fluoropolymer is composed of principal monomer units of TFE and at least one perfluoroalkyl vinyl ether. In such copolymers, the copolymerized perfluorinated ether units constitute from about 10 to about 50 mol % (more preferably 15 to 35 mol %) of total monomer units present in the polymer.

One or more other fluoropolymers may be incorporated into the fluoropolymer having interpolymerized units derived from a nitrogen-containing cure site monomer. In addition, one or more other fluoropolymers (which may include one or more copolymers) may be blended with the fluoropolymer (which may comprise a copolymer) having interpolymerized units derived from a nitrogen-containing cure site monomer. Such other fluoropolymers useful in a blend and/or copolymer include the entire array described above. The other fluoropolymer(s) may lack interpolymerized units derived from a nitrogen-containing cure site monomer and/or may include reactive sites adapted to a selected curative system. For example, two different fluoropolymers, each having interpolymerized units derived from a nitrogen-containing cure site monomer may be blended to provide the fluoropolymer for the present invention.

Another fluoropolymer may be included along with another curative, such as described below, to provide particular properties. For example, a fluoropolymer suitable for peroxide curing and a peroxide curative may be included to improve chemical stability. Such a blend balances the thermal stability and the chemical stability of the resultant blend, and also may provide economic benefits. These other curatives also may be used to cure a blend of nitrogen-containing fluoropolymers without the need to include a fluoropolymer nitrogen-containing cure site monomer.

The nitrogen-containing fluoropolymer(s) preferably make up enough of the total fluoropolymer to provide increased thermal stability over fluoropolymer lacking the composition of the present invention. This amount is generally at least 25 weight percent (wt %), more preferably at least 50 wt %, of the total fluoropolymer in the invention.

The fluoropolymers may be prepared by methods known in the art. For example, the polymerization process can be carried out by free-radical polymerization of the monomers alone or as solutions, emulsions, or dispersions in an organic solvent or water. When fluoropolymer blends are desired, one route of incorporation is through blending the fluoropolymer latices in the selected ratio, followed by coagulation and drying. Further detail of fluoropolymer preparation can be found in WO 99/48939, U.S. Pat. No. 6,077,609, and U.S. Pat. No. 4,335,238, the disclosures of which are herein incorporated by reference.

The cure site component allows one to cure the fluoropolymer. The cure site component generally will comprise at least one nitrogen-containing cure site monomer. The cure site component can be partially or fully fluorinated. Useful nitrogen-containing cure site monomers include nitrile-containing fluorinated olefins and nitrile-containing fluorinated vinyl ethers, such as:

$$CF_2=CFO(CF_2)_LCN \qquad (8)$$

$$CF_2=CFO[CF_2CF(CF_3)O]_q(CF_2O)_sCF(CF_3)CN \qquad (9)$$

$$CF_2=CF[OCF_2CF(CF_3)]_rO(CF_2)_tCN \qquad (10)$$

where, in reference to the above formulas, L=2–12; q=0–4; r=1–2; s=0–6; and t=1–4. Representative examples of such monomers include perfluoro(8-cyano-5-methyl-3,6-dioxa-1-octene), $CF_2=CFO(CF_2)_5CN$, and $CF_2=CFO(CF_2)_3OCF(CF_3)CN$.

Another suitable cure site component useful in the present invention is a fluoropolymer or fluorinated monomer material containing a halogen that is capable of participation in a peroxide cure reaction. Such a halogen may be present along a fluoropolymer chain and/or in a terminal position. Typically the halogen is bromine or iodine. Copolymerization is preferred to introduce the halogen in a position along a fluoropolymer chain. In this route, a selection of the fluoropolymer components mentioned above are combined with a suitable fluorinated cure site monomer. Such a monomer can be selected, for example, from the general formula $Z-R_f-O_x-CF=CF_2$, wherein Z is Br or I, $R_f$ is a substituted or unsubstituted $C_1-C_{12}$ fluoroalkylene, which may be perfluorinated and may contain one or more ether oxygen atoms, and x is 0 or 1. When x is 0, examples of the bromo- or iodo-fluoroolefins include: bromodifluoroethylene, bromotrifluoroethylene, iodotrifluoroethylene, 1-bromo-2,2-difluoroethylene, and 4-bromo-3,3,4,4-tetrafluorobutene-1, and the like. When x is 1, examples of the bromo- or iodo-fluorovinyl ethers include: $BrCF_2OCF=CF_2$, $BrCF_2CF_2OCF=CF_2$, $BrCF_2CF_2CF_2OCF=CF_2$, $CF_3CF(Br)CF_2OCF=CF_2$, and the like. In addition, non-fluorinated bromo- or iodo-olefins, e.g., vinyl bromide and 4-bromo-1-butene, can be used. The amount of cure site component in a side chain position of the fluoropolymer is generally from about 0.05 to about 5 mol % (more preferably from 0.1 to 2 mol %).

The cure site component may also occur in the terminal position of a fluoropolymer chain. Chain transfer agents or initiators are used to introduce the halogen in a terminal position. Generally, a suitable chain transfer agent is introduced in the reaction medium during polymer preparation, or derived from a suitable initiator.

Examples of useful chain transfer agents include those having the formula $R_fZ_x$ wherein $R_f$ is a substituted or unsubstituted $C_1-C_{12}$ fluoroalkyl radical, which may be perfluorinated, Z is Br or I, and x is 1 or 2. Specific examples involving bromide include: $CF_2Br_2$, $Br(CF_2)_2Br$, $Br(CF_2)_4Br$, $CF_2(Cl)Br$, $CF_3CF(Br)CF_2Br$, and the like. Examples of useful initiators include $NaO_2S(CF_2)_nX$, wherein X is Br or I, and n=1–10.

The amount of cure site component in a terminal position in the fluoropolymer is generally from about 0.05 to about 5 mol % (more preferably from 0.1 to 2 mol %).

Cure site component combinations are also useful. For example, a fluoropolymer containing a halogen that is capable of participation in a peroxide cure reaction may also contain a nitrogen-containing cure site component. Generally, from about 0.1 to about 5 mol % (more preferably from about 0.3 to about 2 mol %) of the total cure site component is incorporated into the fluoropolymer.

The fluoropolymer compositions are cured, at least in part, using a catalyst composition that includes a compound having the general formula:

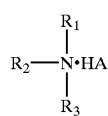

(1)

wherein HA, $R_1$, $R_2$, and $R_3$ are as defined above. The catalyst can be added to the fluoropolymer as a compound or form in situ after adding the appropriate precursors to the fluoropolymer. Examples of catalyst compositions include compounds of the formula:

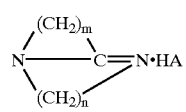

(1A)

wherein m and n are, independently, 2 to 20. In this formula, two of the R groups are included in a heterocyclic group while the third R group is a bond.

Preferred examples of Formula (1A) compounds include those wherein m=3 and n=5 and wherein m=4 and n=2. This includes, for example, salts of 1,8-diazabicyclo [5.4.0] undec-7-ene (DBU) and 1,5-diazabicyclo[4.3.0]non-5-ene (DBN). These salts may be prepared, for example, by reacting DBU or DBN with an organic or inorganic acid in an organic solvent such as methanol or acetone, or they may be prepared in situ. Another preferred compound of Formula 1A is pyridine hydrochloride.

An effective amount of catalyst compound is used to cure the fluoropolymer. Generally, this amount is in the range of 0.05 to 10 (more preferably 0.1 to 5) parts curative per hundred parts fluoropolymer.

The fluoropolymer compositions can be cured using catalyst compositions, described above, optionally with one or more imidate curatives.

The acid can be organic or inorganic, for example $C_7F_{15}COOH$, or any hydrocarbon or fluorine containing carboxylic acid, sulfonic acid, etc., and inorganic acids such as HCl, $HNO_3$, etc., that form stable salts.

The imidate curatives include compounds having the formula $R^1C(OR^2)=NH$, and salts thereof, where $R^1$ and $R^2$ are as defined above and further specified below. Imidates may be prepared as described in Zh. Obs. Khimii, vol. 36(5), pp. 862–71 (1966), Ca 65 12206c and J. Org. Chem., vol. 30, page 3724 (1965), which are herein incorporated by reference. Examples of useful groups for $R^1$ and $R^2$ include fluoroalkyl, perfluoroalkyl, and perfluoro polyether groups (e.g., as described in U.S. Pat. No. 5,266,650). In addition, more than one imidate group may be included in a compound. "Substituted" means substituted by substituents that do not interfere with the desired product. Examples of suitable substituents include halogen (e.g., chlorine, fluorine, bromine, iodine), cyano, alkoxy, and carboxy groups. In addition, one or more of the carbon atoms may be substituted by a heteroatom such as oxygen or nitrogen. $R^1$ is preferably part of a readily available imidate, for example, $CF_3O(CF_2)_mOCF(CF_3)C(NH)OCH_3$ where m is an integer from 1 to 4, and $C_3F_7(O(CF_3)CF_2)_nOCF(CF_3)C(NH)OCH_3$ where n is 0 to 3. $R^2$ is preferably a lower alkyl having from 1 to 6 carbon atoms or $CH_2R_f$ wherein $R_f$ is a perfluoroalkyl having from 1 to 10 carbon atoms. Other useful imidates include

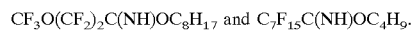

$CF_3O(CF_2)_2C(NH)OC_8H_{17}$ and $C_7F_{15}C(NH)OC_4H_9$.

An effective amount of the selected imidate is used to cure the fluoropolymer to the desired level in the desired time. Generally, this amount is in the range from about 0.01 to about 5 moles imidate per 100 moles fluoropolymer (mol %), preferably from about 0.2 to about 3 mol %.

The combination of the imidate and amine salts results in a synergistic effect of much greater triazine content in press-cured samples when compared to samples made with either material alone. This effect is easily seen when comparing FT-IR spectra of the various samples. For example, FIG. 1 shows the spectra (Line B) of a cured material that included an imidate ($C_7F_{15}C(NH)OC_4H_9$) along with an amine (DBU) and an inorganic acid (HCl) and the spectra (Line A) of a cured material that included the same imidate without the DBU or HCl. There is a much higher triazine peak (1556 $cm^{-1}$) and a much lower nitrile peak (2264 $cm^{-1}$) in the spectra (Line B) of the press-cured material having the combination of the DBU, HCl, and imidate than present in the reference material having the imidate without the DBU-HCl (Line A).

The fluoropolymer compositions can include any of the adjuvants often employed in curable fluoropolymer formulations. For example, one material often blended with a fluoropolymer composition as a part of the peroxide curative system is a coagent (sometimes also referred to as a co-curative) composed of a polyunsaturated compound that is capable of cooperating with the curative to provide a useful cure. These coagents can generally be added in an amount equal to between 0.1 and 10 parts coagent per hundred parts fluoropolymer (phr), preferably between 1 and 5 phr. Examples of useful coagents include triallyl cyanurate; triallyl isocyanurate; tri(methylallyl) isocyanurate; tris (diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate. Other useful coagents include the bis-olefins disclosed in EP 0 661 304 A1, EP 0 784 064 A1, EP 0 769 521 A1, and U.S. Pat. No. 5,585,449.

The fluoropolymer compositions can also be cured by using other types of curatives along with the catalyst compositions described above. Examples of such curatives are known and include bis-aminophenols (e.g., as described in U.S. Pat. No. 5,767,204 and U.S. Pat. No. 5,700,879), bis-amidooximes (e.g., as described in U.S. Pat. No. 5,621,145), and ammonium salts (e.g., as described in U.S. Pat. No. 5,565,512). Organometallic compounds of arsenic, antimony and tin also can be used, for example as described in U.S. Pat. Nos. 4,281,092 and 5,554,680. Particular examples include allyl-, propargyl-, triphenyl-allenyl-, and tetraphenyltin and triphenyltin hydroxide.

In addition, the cure system can be modified by methods known in the art. For example, ammonia-generating compounds may be included to modify the rate of cure of a particular composition. Such ammonia-generating compounds are typically solid or liquid at ambient conditions, and then generate ammonia under conditions of cure. These compounds include, for example, hexamethylene tetramine (urotropin) and dicyan diamid, as well as metal-containing compounds and triazine derivatives. More details regarding such ammonia-generating compounds is found in PCT publication WO 00/09603, which is herein incorporated by reference.

It may be advantageous to add one or more onium salts to the fluoropolymer compositions. Examples of suitable onium salts are described in U.S. Pat. No. 4,882,390. Specific examples include triphenylbenzyl phosphonium chloride, tributyl alkyl phosphonium chloride, tributyl benzyl ammonium chloride, tetrabutyl ammonium bromide, and triarylsulfonium chloride.

The fluoropolymer compositions can be cured using one or more peroxide curatives along with the catalyst compositions described above. Suitable peroxide curatives generally are those which generate free radicals at curing temperatures, such as those described in WO 99/48939, the disclosure of which is herein incorporated by reference.

Dialkyl peroxide and bis(dialkyl peroxide), each of which decomposes at a temperature above 50° C., are especially preferred. In many cases it is preferred to use a di-tertiarybutyl peroxide having a tertiary carbon atom attached to peroxy oxygen atom. Among the most useful peroxides of this type are 2,5-dimethyl-2,5-di (tertiarybutylperoxy)hexyne-3 and 2,5-dimethyl-2,5-di (tertiarybutyl peroxy)hexane. Other peroxides can be selected from such compounds as dicumyl peroxide, dibenzoyl peroxide, tertiarybutyl perbenzoate, a,a'-his(t-butylperoxy-diisopropylbenzene), and di[1,3-dimethyl-3-(t-butylperoxy)-butyl]carbonate. Generally, about 1 to 3 parts of peroxide per 100 parts of fluoropolymer (phr) is used.

Another curative useful in the present invention has the general formula $CH_2=CH—R_f—CH=CH_2$, wherein one or more H atoms may be replaced with halogen atoms, such as F, and $R_f$ is a $C_1–C_8$ linear or branched and at least partially fluorinated alkylene, cycloalkylene, or oxyalkylene. Similarly, polymers containing pendant groups of $CH_2=CHR_f$—are also useful as curatives in the present invention. Such curatives are described, for example, in U.S. Pat. No. 5,585,449.

Another curative useful with this system involves using divalent metal amine complex catalysts, alone or in various combinations as described in copending patent applications U.S. Ser. No. 60/233,386 and U.S. Ser. No. 60/233,383 both filed on Sep. 18, 2000.

The fluoropolymer compositions also can be cured using a catalyst composition that includes a compound having the general formula $\{RA\}^{(-)}\{QR''_k\}^{(+)}$, wherein R is a hydrogen-containing or partially fluorinated $C_1–C_{20}$ alkyl or alkenyl, $C_3–C_{20}$ cycloalkyl, $C_6–C_{20}$ cycloalkenyl, or $C_6–C_{20}$ aryl or alkylaryl, or perfluorinated $C_6–C_{20}$ aryl or alkylaryl; A is an acid anion or an acid derivative anion, Q is phosphorous, sulfur, nitrogen, arsenic, or antimony, k is the one greater than the valence of Q (i.e. k=1+valence of O), and each R" is, independently, hydrogen or a substituted or unsubstituted $C_1–C_{20}$ alkyl, aryl, aralkyl, or alkenyl group. More detail is provided in copending applications U.S. S. No. 60/283,535 and U.S. S. No. 10/060,690.

The combination of catalyst, optional imidate(s), and optional curative(s) is generally from about 0.01 to about 10 mol % (more preferably from about 0.1 to about 5 mol %) of the total fluoropolymer amount.

Additives such as carbon black, stabilizers, plasticizers, lubricants, fillers, and processing aids typically utilized in fluoropolymer compounding can be incorporated into the compositions, provided they have adequate stability for the intended service conditions. In particular, low temperature performance can be enhanced by incorporation of perfluoropolyethers. See, for example, U.S. Pat. No. 5,268,405.

Carbon black fillers are typically also employed in fluoropolymers as a means to balance modulus, tensile strength, elongation, hardness, abrasion resistance, conductivity, and processability of the compositions. Suitable examples include MT blacks (medium thermal black) designated N-991, N-990, N-908, and N-907; FEF N-550; and large particle size furnace blacks. When used, 1 to 70 parts filler per hundred parts fluoropolymer (phr) of large size particle black is generally sufficient.

Fluoropolymer fillers may also be present in the compositions. Generally, from 1 to 50 phr of fluoropolymer filler is used. The fluoropolymer filler can be finely divided and easily dispersed as a solid at the highest temperature used in fabrication and curing of the inventive composition. By solid, it is meant that the filler material, if partially crystalline, will have a crystalline melting temperature above the processing temperature(s) of the curable composition(s). The preferred way to incorporate fluoropolymer filler is by blending latices. This procedure, including various kinds of fluoropolymer filler, is described in U.S. Ser. No. 09/495,600, filed Feb. 1, 2000, the disclosure of which is herein incorporated by reference.

One or more acid acceptors can also be added to the formulations. However, where the presence of extractable metallic compounds is undesirable (such as for semiconductor applications) the use of inorganic acid acceptors should be minimized, and preferably avoided altogether. Commonly used acid acceptors include, for example, zinc oxide, calcium hydroxide, calcium carbonate, magnesium oxide, etc. These compounds generally are used in the fluoropolymer formulation to bind any HF or other acids that might be generated at the high temperatures where the fluoropolymers are intended to function.

The curable fluoropolymer compositions of the invention may also be combined with other curable fluoropolymer compositions such as peroxide-curable fluoropolymer compositions. These additional curable fluoropolymer compositions typically employ small amounts of cure site monomers as a comonomer. Suitable cure site monomers are those which, when combined with a curative (e.g., a peroxide) and, preferably a coagent, will provide a cured composition. Preferably these cure site monomers include at least one halo group (e.g., a bromo or an iodo group).

The curable fluoropolymer compositions can be prepared by mixing the fluoropolymer, the divalent metal amine complex catalyst, the selected additive or additives, additional curatives (if any), and the other adjuvants, if any, in conventional rubber processing equipment. The desired amounts of compounding ingredients and other conventional adjuvants or ingredients can be added to the unvulcanized fluorocarbon gum stock and intimately admixed or compounded therewith by employing any of the usual rubber mixing devices such as internal mixers, (e.g., Banbury mixers), roll mills, or any other convenient mixing device. The temperature of the mixture during the mixing process typically should not rise above about 120° C. During mixing, it is preferable to distribute the components and adjuvants uniformly throughout the gum for effective cure.

The mixture is then processed and shaped, such as by extrusion (for example, in the shape of a hose or hose lining) or by molding (for example, in the form of an O-ring seal). The shaped article can then be heated to cure the gum composition and form a cured article.

Pressing of the compounded mixture (i.e., press cure) usually is conducted at a temperature sufficient to cure the mixture in a desired time duration under a suitable pressure. Generally, this is between about 95° C. and about 230° C., preferably between about 150° C. and about 205° C., for a period of from about 1 minute to 15 hours, typically from 5 minutes to 30 minutes. A pressure of between about 700 kPa and about 20,600 kPa is usually imposed on the compounded mixture in a mold. The molds first may be coated with a release agent and prebaked. The molded vulcanizate is then usually post-cured (e.g., oven-cured) at a temperature and for a time sufficient to complete the curing, usually between about 150° C. and about 300° C., typically at about 232° C., for a period of from about 2 hours to 50 hours or more, generally increasing with the cross-sectional thickness of the article. For thick sections, the temperature during the post cure is usually raised gradually from the lower limit of the range to the desired maximum temperature. The maximum temperature used is preferably about 300° C., and this value is held for about 4 hours or more.

Following cure, the article can be heat aged in air. One useful example of a heat aging protocol ages the article in air for about 70 hours at a temperature of about 290° C.

The fluoropolymer compositions are useful in production of articles such as O-rings, gaskets, tubing, and seals. Such articles are produced by molding a compounded formulation of the fluoropolymer composition with various additives under pressure, curing the article, and then subjecting it to a post-cure cycle. The curable compositions formulated without inorganic acid acceptors are particularly well suited for applications such as seals and gaskets for manufacturing semiconductor devices, and in seals for high temperature automotive uses.

The invention will now be described further by way of the following examples.

EXAMPLES

In the following examples, indicated results were obtained using the following test methods:

Cure rheology: Tests were run on uncured, compounded samples using a Monsanto Moving Die Rheometer (MDR) Model 2000 in accordance with ASTM D 5289-93a at 177° C., no pre-heat, 30 minute elapsed time, and a 0.5 degree arc. Both the minimum torque ($M_L$) and highest torque attained during a specified period of time when no plateau or maximum torque was obtained ($M_H$) were measured. Also measured were the time for the torque to increase 2 units above $M_L$ ("$t_s$, 2"), the time for the torque to reach a value equal to $M_L+0.5(M_H-M_L)$ ("t'50"), and the time for the torque to reach $M_L+0.9(M_H-M_L)$ ("t'90").

Press-Cure: Sample sheets measuring 150×150×2.0 mm were prepared for physical property determination by pressing at about 6.9 Mega Pascals (MPa) for 30 minutes at 177° C., unless otherwise noted.

Post-Cure: Press-cured sample sheets were exposed to heat under nitrogen using the following six stages of conditions: 25 to 200° C. over 6 hours; 200° C. for 16 hours; 200 to 250° C. over 2 hours; 250° C. for 8 hours; 250 to 300° C. over 2 hours; and 300° C. for 16 hours. The samples were returned to ambient temperature before testing.

Heat Aging: Press-cured and post-cured sample sheets were exposed to heat in air for 70 hours at 290° C. and then returned to ambient temperature before testing.

Physical Properties: Tensile Strength at Break, Elongation at Break, and Modulus at 100% Elongation were determined using ASTM D 412-92 on samples cut from the press-cure or post-cure sheet with ASTM Die D. Units are reported MPa.

Hardness: Samples were measured using ASTM D 2240-85 Method A with a Type A-2 Shore Durometer. Units are reported in points.

Compression set: O-ring samples were measured using ASTM 395-89 Method B. The O-rings had a cross-sectional thickness of 0.139 in. (3.5 mm.). Results are reported as a percentage of permanent set.

Example 1

A fluoroelastomer was prepared which contained 63.8 mole percent tetrafluoroethylene, 35.0 mole percent perfluoromethyl vinyl ether, and 1.2 mole percent of a nitrogen-containing cure site monomer, $CF_2=CFO(CF_2)_5CN$, by aqueous emulsion polymerization. The resulting polymer (100 g) was compounded with: 15 g of FEF N550 carbon black, 2 g of an imidate, $CF_3OCF_2CF_2C(NH)OC_8H_{17}$, 0.75 g of triphenyl benzyl phosphonium chloride (TPBPCl), and 0.5 g of DBU—HCl, made by combining equi-molar amounts of DBU and HCl gas in methanol followed by stripping the methanol under vacuum.

Cure rheology tests were run on the uncured, compounded sample. A sheet of the compounded admixture was pressed for 45 minutes at 177° C., subsequently post-cured, and heat aged. The results of testing at each stage are included in Table 1, below.

Example 2

The procedure of Example 1 was followed except that no TPBPCl was used. The test results are included in Table 1.

Example 3

The procedure of Example 1 was followed except that no DBU—HCl was used and 2 g of another organic acid, DBU—HOOCC$_7$F$_{15}$ was included. The acid was made by combining equi-molar amounts of DBU and C$_7$F$_{15}$COOH in methanol followed by stripping the methanol under vacuum. Test results are included in Table 1.

Example 4

The procedure of Example 1 was followed except that 4 g of DBU—C$_7$F$_{15}$COOH was added and no TPBPCl, no DBU—HCl, and no CF$_3$OCF$_2$CF$_2$C(NH)OC$_8$H$_{17}$ were included. In addition, 15 g of Thermax MT N990 carbon black was substituted for the N550 carbon black of Example 4. Test results are included in Table 1. After the press cure of this example, sample sheets had small blisters while O-ring samples appeared smooth.

Comparative Example CE-1

A fluoroelastomer was prepared which contained 62.1 mole percent tetrafluoroethylene, 36.8 mole percent perfluoromethyl vinyl ether, and 1.1 mole percent of a nitrogen-containing cure site monomer, CF$_2$=CFO(CF$_2$)$_5$CN, by aqueous emulsion polymerization. The resulting polymer (100 g) was compounded with: 15 g of FEF N550 carbon black, and 2.0 g of tetraphenyl tin.

Cure rheology tests were run on the uncured, compounded sample. Sample sheets of the compounded admixture were press-cured, post-cured, and heat aged. The results of testing at each stage are included in Table 1, below.

In Table 1, N/M indicates that the property was not measured.

TABLE 1

| Test Results | | | | | |
|---|---|---|---|---|---|
| | Ex 1 | Ex 2 | Ex 3 | Ex 4 | CE 1 |
| M$_L$ (N m) | 0.118 | 0.120 | 0.047 | 0.020 | 0.228 |
| M$_H$ (N m) | 1.221 | 1.354 | 0.964 | 1.259 | 1.773 |
| t$_s$2 (min) | 7.58 | 12.85 | 3.88 | 15.53 | 0.48 |
| t'50 (min) | 11.73 | 22.23 | 5.03 | 19.71 | 0.76 |
| t'90 (min) | 28.05 | 42.81 | 29.8 | 50.32 | 5.75 |
| Tensile Strength at Break (MPa) | 18.14 | 16.96 | 18.13 | N/M | 13.75 |
| Elongation at Break (%) | 120 | 120 | 136 | N/M | 144 |
| 100% Modulus (MPa) | 12.09 | 10.94 | 11.03 | N/M | 7.39 |
| Shore A Hardness | 70 | 71 | 72 | N/M | 72 |
| Heat Aged | | | | | |
| Tensile Strength at Break (MPa) | 13.45 | 14.66 | 15.24 | N/M | 11.86 |
| Elongation at Break (%) | 138 | 157 | 169 | N/M | 250 |
| 100% Modulus (MPa) | 7.37 | 6.24 | 6.60 | N/M | 3.65 |
| Shore A Hardness | 71 | 69 | 71 | N/M | 71 |

TABLE 1-continued

| Test Results | | | | | |
|---|---|---|---|---|---|
| | Ex 1 | Ex 2 | Ex 3 | Ex 4 | CE 1 |
| Compression Set (%): | | | | | |
| 70 hrs @ 200° C. | 11.0 | 10.2 | 12.6 | 7.7 | 59.5 |
| 70 hrs @ 230° C. | 12.2 | 14.1 | 17.3 | 11.9 | 76.6 |

The results demonstrate that compositions prepared using the inventive catalyst compositions exhibit improved properties relative to compositions prepared using an organotin cure catalyst. Most notably, the inventive fluoropolymers exhibited substantially lower compression set values.

A number of embodiments of the invention have been described. Nevertheless, it will be understood that various modifications may be made without departing from the spirit and scope of the invention.

What is claimed is:

1. A composition comprising:
   (a) a fluoropolymer comprising interpolymerized units derived from a nitrogen-containing cure site monomer; and
   (b) a catalyst composition comprising a compound having the general formula:

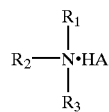

wherein the group HA is an acid, and each R$_1$, R$_2$, and R$_3$ is, independently, the same or a different C$_1$–C$_{20}$ alkyl group, be C$_3$–C$_{20}$ cyclic or heterocyclic group, R$_f$(CH$_2$)$_x$—wherein R$_f$ is a C$_1$–C$_8$ linear or branched and at least partially fluorinated alkylene, cycloalkylene, or oxyalkylene, and x is 1 to 4, or a bond to another R group such that the nitrogen is bonded to or part of an imino or heterocyclic group;

wherein two or more R groups may be linked to form a cyclic, bicyclic or aromatic group, optionally comprising a heteroatom, and wherein the composition is free of peroxide.

2. The composition according to claim 1 further comprising a catalyst composition comprising a compound having the formula R$^1$C(OR$^2$)=NH, and salts thereof, where R$^1$ and R$^2$, independently, are a substituted or unsubstituted C$_1$–C$_{20}$ alkyl, aryl, aralkyl, alkenyl, cycloalkyl, or cycloalkenyl group.

3. The composition according to claim 1 wherein the catalyst includes a compound having the general formula:

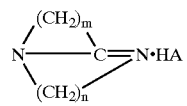

wherein m and n are, independently, 2 to 20.

4. The composition according to claim 3 wherein n and m are, independently, 2 to 5.

5. The composition of claim 4 wherein the catalyst composition contains least one of 1,8-diazabicyclo[5.4.0]undec-7-ene and 1,5-diazabicyclo[4.3.0]non-5-ene.

6. The composition according to claim 1 wherein IIA is selected from the group consisting of inorganic acids, organic carboxylic acids, and organic sulfonic acids.

7. The composition according to claim 1 wherein the fluoropolymer comprises interpolymerized units derived from (i) tetrafluoroethylene, and optionally, (ii) one or more perfluorovinyl ethers of the formula: $CF_2=CFO(R_fO)_aR_f$ wherein each $R_f$ is independently a linear or branched $C_1$–$C_6$ perfluoroalkylene group; and a is 0 or an integer from 1 to 20.

8. A composition according to claim 1 wherein said fluoropolymer further comprises interpolymerized units derived from monomers selected from the group consisting of perfluoroolefins, partially-fluorinated olefins, non-fluorinated olefins, vinylidene fluoride, and combinations thereof.

9. A composition according to claim 1 wherein said cure site monomer is a nitrile-containing monomer having the formula $CF_2=CFO(CF_2)_LCN$;

$CF_2=CFO\ [CF_2CF(CF_3)O]_q(CF_2O)_yCF(CF_3)CN$; or $CF_2=CF[OCF_2CF(CF_3)]_rO(CF_2)_tCN$ wherein L=2–12; q=0–4; y=0–6; r=1–2; and t=1–4.

10. A composition according to claim 1 further comprising a filler selected from the group consisting of fluoropolymer filler, carbon black, and combinations thereof.

11. A composition according to claim 1 wherein said catalyst composition further comprises an onium salt.

12. A composition according to claim 1 further comprising an additional curative, and optionally a coagent.

13. The composition of claim 12 wherein the additional curative is selected from the group consisting of ammonium salts, ammonia-generating compounds, substituted triazine derivatives, unsubstituted triazine derivatives, peroxides, bis-aminophenols, bis-amidooximes, and organo-metatlic compounds.

14. The composition of claim 1 further comprising one or more other fluoropolymer(s).

15. The composition of claim 1 wherein the catalyst composition is prepared in situ.

16. The composition according to claim 1 wherein the fluoropolymer further comprises interpolymerized units derived from (i) one or more perfluorovinyl ether(s); (ii) one or more monomer(s) selected from the group consisting of perfluoroolefins, olefins, and vinylidene fluoride; (iii) one or more other nitrogen-containing cure site monomer(s); or (iv) combinations thereof.

17. A method of making a fluoropolymer composition comprising the steps of:
a) forming a mixture comprising the composition of claim 1;
b) shaping the mixture;
c) curing the shaped mixture; and optionally
d) heat aging the cured mixture.

18. The method according to claim 17 wherein the fluoropolymer comprises interpolymerized units derived from tetrafluoroethylene, and optionally one or more perfluorovinyl ether(s).

19. A method according to claim 17 wherein HA is selected from an inorganic acid, or an organic carboxylic or sulfonic acid.

20. A method according to claim 17 wherein the catalyst is formed in situ.

21. A method according to claim 17 wherein the catalyst composition contains a group selected from the group consisting of 1,8-diazabicyclo[5.4.0]undec-7-ene and 1,5-diazabicyclo[4.3.0]non-5-ene.

22. A method according to claim 17 further comprising a catalyst composition comprising a compound having the formula $R^1C(OR^2)=NH$, and salts thereof, where $R^1$ and $R^2$ are, independently, a substituted or unsubstituted $C_1$–$C_{20}$ alkyl, aryl, aralkyl, alkenyl, cycloalkyl or cycloalkenyl group.

23. A method according to claim 17 wherein said fluoropolymer further comprises interpolymerized units derived from monomers selected from the group consisting of perfluoroolefins, olefins, vinylidene fluoride, and combinations thereof.

24. A cured article prepared according to the method of claim 17.

25. A cured article according to claim 24 wherein said article is selected from the group consisting of a seal, an O-ring, a gasket, and tubing.

26. The composition of claim 1 wherein the catalyst composition contains pyridine.

* * * * *

UNITED STATES PATENT AND TRADEMARK OFFICE
CERTIFICATE OF CORRECTION

PATENT NO. : 6,794,457 B2
DATED : September 21, 2004
INVENTOR(S) : Grootaert, Werner M. A.

It is certified that error appears in the above-identified patent and that said Letters Patent is hereby corrected as shown below:

Column 7,
Line 27, "norbomene" should be shown as -- norbornene --

Column 8,
Line 10, "a,a'-his(t-" should be shown as -- a,a'-bis(t- --

Column 10,
Line 28, "("$t_S$,2")," should be shown as -- ("$t_S$2"), --

Column 13,
Line 1, "IIA" should be shown as -- HA --

Signed and Sealed this

First Day of February, 2005

JON W. DUDAS
*Director of the United States Patent and Trademark Office*